United States Patent
Komoto et al.

(10) Patent No.: US 11,803,147 B2
(45) Date of Patent: Oct. 31, 2023

(54) ENDLESS BELT WITH MONOMER HAVING ALIPHATIC RING

(71) Applicant: HEWLETT-PACKARD DEVELOPMENT COMPANY, L.P., Spring, TX (US)

(72) Inventors: Keiji Komoto, Yokohama (JP); Satoru Furuya, Yokohama (JP); Satoshi Ohwada, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 238 days.

(21) Appl. No.: 17/483,027

(22) Filed: Sep. 23, 2021

(65) Prior Publication Data
US 2022/0113660 A1 Apr. 14, 2022

(30) Foreign Application Priority Data

Oct. 12, 2020 (JP) .................. 2020-171888

(51) Int. Cl.
| | |
|---|---|
| C08F 2/50 | (2006.01) |
| C08F 222/10 | (2006.01) |
| C08G 59/22 | (2006.01) |
| C08G 59/32 | (2006.01) |
| G03G 15/20 | (2006.01) |

(52) U.S. Cl.
CPC .......... *G03G 15/2057* (2013.01); *C08F 2/50* (2013.01); *C08F 222/10* (2013.01); *C08F 222/102* (2020.02); *C08F 222/104* (2020.02); *C08G 59/22* (2013.01); *C08G 59/32* (2013.01); *G03G 15/20* (2013.01)

(58) Field of Classification Search
CPC .......... C08F 2/50; C08F 222/10; C08G 59/22; C08G 59/32; G03G 15/20
See application file for complete search history.

(56) References Cited

U.S. PATENT DOCUMENTS

| | | |
|---|---|---|
| 2011/0086939 A1 | 4/2011 | Ito et al. |
| 2012/0002932 A1 | 1/2012 | Takenobu et al. |

FOREIGN PATENT DOCUMENTS

| | | |
|---|---|---|
| JP | 2001-91705 | 4/2001 |
| JP | 2003-316097 | 11/2003 |
| JP | 2011-123430 | 6/2011 |

*Primary Examiner* — Caixia Lu
(74) *Attorney, Agent, or Firm* — Foley & Lardner LLP (57) ABSTRACT

An endless belt includes a loop-shaped support and a surface layer formed on the support. The surface layer contains a polymer including, as monomer units, a first monomer having a polymerizable group and an aliphatic ring, a second monomer having a polymerizable group and a fluorine atom, and a third monomer having 4 or more polymerizable groups.

15 Claims, 2 Drawing Sheets

ENDLESS BELT WITH MONOMER HAVING ALIPHATIC RING

CROSS REFERENCE TO RELATED APPLICATIONS

This application claims priority benefit of Japanese Patent Application No. 2020-171888 filed on Oct. 12, 2020, the contents of which are incorporated herein by reference.

BACKGROUND

In electrophotography, a photoreceptor surface is charged, an electrostatic image is then formed on this photoreceptor surface, an electrostatic latent image is developed with a developer containing toner to form a toner image according to the electrostatic latent image. Subsequently, this toner image is transferred to a surface of a sheet or the like and is fixed thereto, to form a fixed image. The fixed image may be subjected to a gloss treatment in some cases by a gloss treatment device. For example, the gloss treatment device remelts the toner fixed to the sheet or the like by heating and applying pressure, and subsequently cooling the toner while the toner is in surface contact with a smooth surface of the belt to smoothen a surface of the toner image.

DETAILED DESCRIPTION

Figure 1:
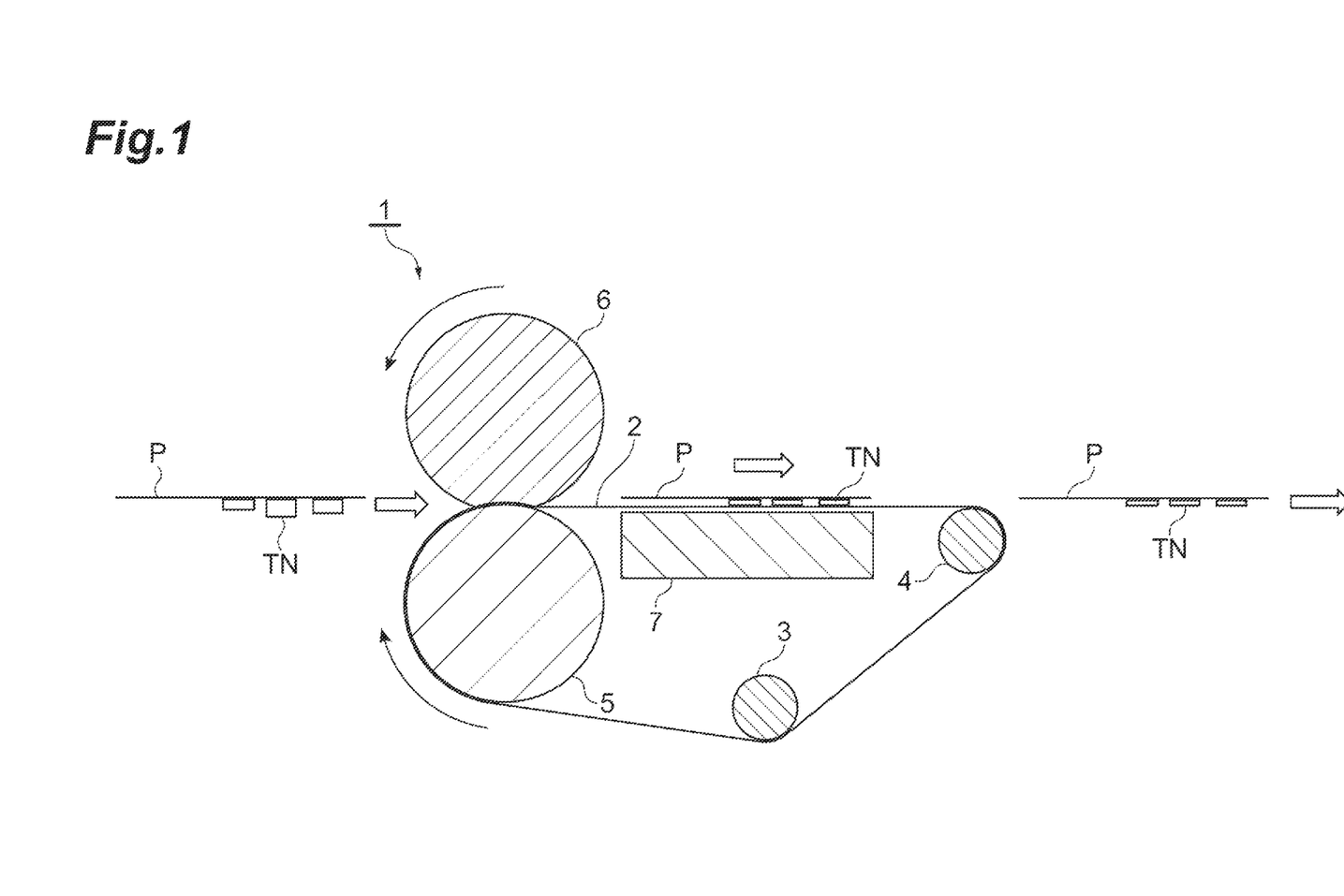
FIG. 1 is a schematic cross-sectional view of an example gloss treatment device.

FIG. 1 is a schematic cross-sectional view of an example gloss treatment device (also referred to as a glossiness processing device). According to an example, the gloss treatment device 1 performs gloss treatment (also referred to as glossiness processing) on a sheet (an image support) P such as a sheet of paper, to which toner TN is fixed. The gloss treatment device 1 includes, for example, an endless belt (a conveying belt) 2, first and second rollers 3 and 4 (stretching or tensioning rollers), a heating roller 5 (a heating unit or heating device), a pressure roller 6 (a pressure unit or pressure device), and a cooling device 7 (a cooling unit or cooling device).

The endless belt 2 is a looped belt (a belt forming a loop) that conveys the sheet P. The endless belt 2 conveys the sheet P on an outer circumferential surface thereof along a conveying path of the sheet P. The outer circumferential surface of the endless belt 2 is formed in a smooth surface in order to smoothen the toner TN of the sheet P. The conveying speed of the endless belt 2 may be, for example, 5 to 200 mm/sec.

The first roller 3 and the second roller 4 are stretching rollers (or tensioning roller) that engage with the endless belt 2. The number of such tensioning rollers is two in some examples, and may be one in other examples, or three or more according to yet other examples. The first roller 3 and the second roller 4 are rotatable around respective axes. Either of the first roller 3 and the second roller 4 may be a driving roller or a driven roller, depending on examples.

The heating roller 5 is a heating unit (or heating device) that heats the endless belt 2. The heating roller 5 is a heating element for remelting the toner TN fixed to the sheet P by heating. For example, the endless belt 2 heated by the heating roller 5 heats the toner TN fixed to the sheet P. The heating roller 5 may be a driving roller or may be a driven roller, depending on examples. The heating roller 5 is formed, for example, of a metal material such as aluminum or iron. The heating roller 5 may have a structure of two or more layers including a base material formed of a metal material and a release layer. The outer diameter of the heating roller 5 may be, for example, 25 to 60 mm.

The first roller 3, the heating roller 5, and the second roller 4 are disposed in this order, in a rotational direction of the belt, so as to convey the sheet in a conveying direction (a direction indicated by the arrow in FIG. 1). The first roller 3, the heating roller 5, and the second roller 4 are disposed adjacent the inner circumferential side of the endless belt 2 to suspend (or support) the endless belt 2. Accordingly, the sheet P is conveyed, for example, on the outer circumferential surface of the endless belt 2 between the heating roller 5 and the second roller 4.

The pressure roller 6 is a pressure unit (or pressure device) that presses the endless belt 2 against the heating roller 5. The pressure roller 6 is disposed to a side opposite to the heating roller 5 with respect to the endless belt 2, and may be pressed against the heating roller 5 via the endless belt 2 by a pressing mechanism, for example. The pressing mechanism may include, for example, a biasing mechanism that urges the pressure roller 6 toward the heating roller 5 and a supporting mechanism that maintains the pressure roller 6 pressed against the heating roller 5.

The pressure roller 6 may be a driven roller in some examples, or may be a driving roller in other examples. The pressure roller 6 may have, for example, a three-layer structure composed of a base material, an elastic layer, and a release layer. A heating member may be provided inside the pressure roller 6.

According to examples, the base material of the pressure roller 6 may be formed of a metal material such as aluminum or iron. According to examples, the elastic layer of the pressure roller 6 may be formed of silicone rubber or the like. The release layer of the pressure roller 6 may be formed of a fluorine-based resin such as PFA or PTFE. The thickness of the elastic layer may be, for example, 0.1 to 20 mm. The thickness of the release layer may be, for example, 5 to 100 pam.

A nip portion for heating and applying pressure to the sheet P is formed between the heating roller 5 and the pressure roller 6. In the nip portion, the endless belt 2 is in contact with both the heating roller 5 and the pressure roller 6. The pressure roller 6 applies a pressure to the sheet P passing through the nip portion. As an example, since the heating roller 5 is formed of a material having a greater hardness than that of the pressure roller 6, the pressure roller 6 may be deformed at the nip portion, to form a (concave) shape due to pressure from the roller 6. This shape is formed in order to adjust the quality of an image, or the like. As another example, the heating roller may be deformed at the nip portion to form a (convex) shape due to pressure from the pressure roller 6.

The cooling device 7 cools and solidifies the toner TN remelted by the heating roller 5 to smoothen the toner TN fixed to the sheet P. The cooling device 7 may be, for example, a heat sink, a cooling fan, a heat pipe, or a Peltier element. The cooling device 7 is disposed at the downstream side of the heating roller 5 in the conveyance direction of the conveying path (between the heating roller 5 and the second roller 4). The cooling device 7 is, for example, disposed adjacent the inner circumferential side of the endless belt 2 in order to cool the endless belt 2. Accordingly, the endless belt 2 cooled by the cooling device 7 may cool the toner TN on the endless belt 2.

Figure 2:
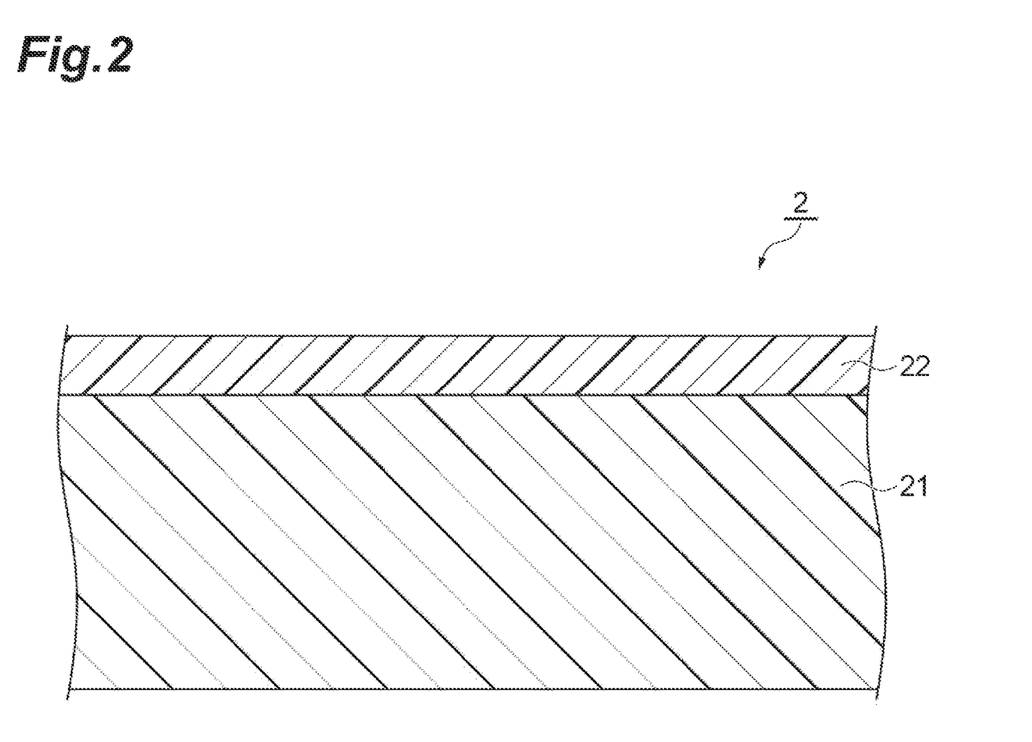
FIG. 2 is a schematic cross-sectional view of an example endless belt.

The example endless belt 2 will be further described with reference to FIG. 2 which schematically illustrates a cross-sectional view of the example endless belt 2. The example endless belt 2 includes a loop-shaped support 21 and a surface layer 22 formed on the support 21. The support 21 is positioned at the inner circumferential side of the endless belt 2 and the surface layer 22 is positioned at the outer circumferential side of the endless belt 2. That is, the surface layer 22 is formed on the outer circumferential surface of the support 21 and forms the outermost surface of the endless belt 2. Accordingly, the surface layer 22 contacts the toner TN fixed to the sheet P in order to smoothen the toner TN.

The support 21 may be formed of a polymer, for example. Examples of the polymer include polyimide, polyether ether ketone, and polyamide imide. The thickness of the support 21 may be, for example, 30 μm or more in some examples, or 50 μm or more in other examples, and may be 150 μm or less in some examples, or 100 μm or less in other examples. The thermal conductivity of the support 21 may be, for example, 0.1 to 2 W/mk.

The surface layer 22 contains a polymer which includes, as monomer units, a first monomer having a polymerizable group and an aliphatic ring, a second monomer having a polymerizable group and a fluorine atom, and a third monomer having four or more polymerizable groups. The first monomer, the second monomer, and the third monomer may each contain one kind among the monomers described below according to some examples, or may contain two or more kinds among such monomers according to other examples. The surface layer 22 contains such a polymer, so as to impart an increased flexibility (or bendability) to the endless belt 2.

The polymerizable group in the first monomer, the polymerizable group in the second monomer, and the polymerizable groups in the third monomer may be the same as one another, and may be, for example, a (meth)acryloyl group or an epoxy group, depending on examples. In some examples, the polymerizable group in the first monomer, the polymerizable group in the second monomer, and the polymerizable groups in the third monomer may each correspond to a (meth)acryloyl group. The "(meth)acryloyl group" refers to an acryloyl group and a methacryloyl group, and other similar expressions may be understood similarly.

The number of carbon atoms of the aliphatic ring in the first monomer may be, for example, 5 or more, 6 or more, 7 or more, 8 or more, or 9 or more, depending on examples, and may be 12 or less, 11 or less, or 10 or less depending on the examples. Examples of the aliphatic ring include a cyclopentane ring, a cyclohexane ring, a cycloheptane ring, a cyclooctane ring, and a tricyclodecane ring.

The first monomer may have, for example, one to four polymerizable groups and an aliphatic ring in some examples, may have two or three polymerizable groups and an aliphatic ring in other examples, and may have two polymerizable groups and an aliphatic ring in yet other examples. To further increase flexibility, the first monomer may contain a compound according to the formula (1A) represented below or a compound according to the formula (1B) represented below. In some examples, the first monomer contains a compound according to the formula (1A). The formula (1A) is represented by:

(1A)

wherein $R^{11}$ and $R^{12}$ each independently represents a hydrogen atom or a methyl group, and $R^{13}$ represents a divalent group having an aliphatic ring. The formula (1B) is represented by:

(1B)

wherein $R^{14}$ represents a divalent group having an aliphatic ring.

$R^{13}$ and $R^{14}$ each may be a divalent group represented by $-R^{15}-A^{1}-R^{16}-$ wherein $A^{1}$ is an aliphatic ring in some examples, and may be a cyclopentane ring, a cyclohexane ring, a cycloheptane ring, a cyclooctane ring, or a tricyclodecane ring in other examples. $R^{15}$ and $R^{16}$ may each independently be an alkylene group, an alkylene group having 1 to 4 carbon atoms, or a methylene group, depending on examples.

Some examples of the first monomer having a (meth)acryloyl group include cyclopentane dimethanol di(meth)acrylate, cyclohexane dimethanol di(meth)acrylate, cycloheptane dimethanol di(meth)acrylate, cyclooctane dimethanol di(meth)acrylate, and tricyclodecane dimethanol di(meth)acrylate.

Some examples of the first monomer having an epoxy group include cyclopentane dimethanol diglycidylether, cyclohexane dimethanol diglycidylether, cycloheptane dimethanol diglycidylether, cyclooctane dimethanol diglycidylether, and tricyclodecane dimethanol diglycidylether.

The second monomer may have one to four polymerizable groups and a group in which at least one hydrogen atom in a hydrocarbon group is substituted with a fluorine atom (this group may be referred to as a "fluorine-substituted hydrocarbon group" in the present disclosure) according to some examples, may have two or three polymerizable groups and a fluorine-substituted hydrocarbon group according to other examples, or may have two polymerizable groups and a fluorine-substituted hydrocarbon group in yet other examples. The hydrocarbon group in the fluorine-substituted hydrocarbon group may be, for example, a chain alkyl group or a chain alkylene group. In order to impart a superior offset resistance, the second monomer may contain a compound represented by the following formula (2A) or a compound represented by the following formula (28). In some examples, the second monomer contains a compound according to the formula (2A) which is represented by:

(2A)

wherein $R^{21}$ and $R^{22}$ each independently represents a hydrogen atom or a methyl group, and $R^{23}$ represents a divalent group having a fluorine-substituted hydrocarbon group. The formula (2B) is represented by:

(2B)

wherein $R^{24}$ represents a divalent group having a fluorine-substituted hydrocarbon group.

The hydrocarbon group in the fluorine-substituted hydrocarbon group in $R^{23}$ and $R^{24}$ may be a chain alkyl group or a chain alkylene group. The chain alkyl group or the chain alkylene group may be linear in some examples, or may be branched in other examples. $R^{23}$ and $R^{24}$ each may be, for example, a divalent group composed of a fluorine-substituted hydrocarbon group in some examples, or may be a divalent group in which a plurality of fluorine-substituted hydrocarbon groups are bonded to each other by a hetero atom (for example, an oxygen atom) in other examples. The number of carbon atoms of such a fluorine-substituted hydrocarbon group may be, for example, 1 to 8. All hydrogen atoms in the hydrocarbon group in such a fluorine-substituted hydrocarbon group may be substituted with fluorine atoms.

Some examples of the second monomer having a (meth)acryloyl group include 3,3,3-trifluoro-2-(trifluoromethyl)propane-1,2-diol di(meth)acrylate, 1,1,1-trifluoro-2-(trifluoromethyl)pentane-2,4-diol di(meth)acrylate, 2,2,3,3,4,4,5,5-octafluoro-1,6-hexanediol di(meth)acrylate, 4,4,5,5,6,6,6-heptafluorohexane-1,2-diol di(meth)acrylate, 1H,1H,2H,3H,3H-perfluoroheptane-1,2-diol di(meth)acrylate, 1H,1H,2H,3H,3H-perfluoroheptane-1,2-diol di(meth)acrylate, 2,2,3,3,4,4,5,5,6,6,7,7-dodecafluoro-1,8-octanediol di(meth)acrylate, and 1H,1H,11H,11H-perfluoro-3,6,9-trioxaundecane-1,11-diol di(meth)acrylate.

Some examples of the second monomer having an epoxy group include 3,3,3-trifluoro-2-(trifluoromethyl)propane-1,2-diol diglycidylether, 1,1,1-trifluoro-2-(trifluoromethyl)pentane-2,4-diol diglycidylether, 2,2,3,3,4,4,5,5-octafluoro-1,6-hexanediol diglycidylether, 4,4,5,5,6,6,6-heptafluorohexane-1,2-diol diglycidylether, 1H,1H,2H,3H,3H-perfluoroheptane-1,2-diol diglycidylether, 1H,1H,2H,3H,3H-perfluoroheptane-1,2-diol diglycidylether, and 1H,1H,11H,11H-perfluoro-3,6,9-trioxaundecane-1,11-diol diglycidylether.

The number of the polymerizable groups in the third monomer may be 4 or more, 5 or more, or 6 or more, depending on examples, and may be 8 or less, 7 or less, or 6 or less, depending on examples. In order to increase strength, the third monomer may contain a compound represented by the following formula (3A) or a compound represented by the following formula (3B). In some examples, the third monomer contains a compound according to the formula (3A) represented by:

(3A)

wherein m represents an integer of 4 or more, the four or more $R^{31}$'s each independently represents a hydrogen atom or a methyl group, and $R^{32}$ represents a residue of a polyhydric alcohol from which m hydroxyl groups are removed. The formula (3B) is represented by:

(3B)

wherein n represents an integer of 4 or more, and $R^{33}$ represents a residue of a polyhydric alcohol from which n hydroxyl groups are removed.

In the formulae (3A) and (3B), m and n may be an integer of 5 or more or 6 or more, and may be an integer of 8 or less, 7 or less, or 6 or less, depending on examples. The polyhydric alcohols in $R^{32}$ and $R^{33}$ may be polyhydric alcohols having a valence of m or more and a valence of n or more, respectively, may be a polyhydric alcohol having a valence of 4 or more, 5 or more, or 6 or more, and may be a polyhydric alcohol having a valence of 8 or less, 7 or less, or 6 or less, depending on examples.

Some examples of the third monomer having a (meth)acryloyl group include ditrimethylol propane tetra(meth)acrylate, pentaerythritol tetra(meth)acrylate, dipentaerythritol penta(meth)acrylate, dipentaerythritol hexa(meth)acrylate, and U-6LPA (product name: SHIN-NAKAMURA CHEMICAL CO, LTD.).

Some examples of the third monomer having an epoxy group include ditrimethylol propane tetraglycidylether, pentaerythritol tetraglycidylether, dipentaerythritol pentaglycidylether, and dipentaerythritol hexaglycidylether.

The content of the first monomer may be 2% by mass or more, 5% by mass or more, 10% by mass or more, 12% by mass or more, 15% by mass or more, or 20% by mass or more, depending on examples, based on the total amount of the monomer units constituting the polymer, so as to obtain a superior flexibility. Additionally, the content of the first monomer may be 80% by mass or less, 70% by mass or less, 60% by mass or less, 50% by mass or less, or 40% by mass or less, depending on examples, based on the total amount of the monomer units constituting the polymer.

The content of the second monomer may be 0.5% by mass or more, 2% by mass or more, 5% by mass or more, 8% by mass or more, 10% by mass or more, or 11% by mass or more, depending on examples, based on the total amount of the monomer units constituting the polymer, in order to increase offset resistance. Additionally, the content of the second monomer may be 50% by mass or less, 40% by mass or less, 30% by mass or less, or 20% by mass or less, depending on examples, based on the total amount of the monomer units constituting the polymer.

The content of the third monomer may be 7% by mass or more, 20% by mass or more, 30% by mass or more, 40% by mass or more, or 50% by mass or more, depending on examples, based on the total amount of the monomer units constituting the polymer, in order to impart increased strength. Additionally, the content of the third monomer may be 85% by mass or less, 80% by mass or less, 70% by mass or less, 60% by mass or less, or 50% by mass or less, depending on examples, based on the total amount of the monomer units constituting the polymer.

The polymer in the surface layer 22 may include the first monomer, the second monomer, and the third monomer as monomer units, without any other monomers according to some examples, or may further include other monomers in addition to the first monomer, the second monomer, and the third monomer in other examples.

The total content of the first monomer, the second monomer, and the third monomer may be 80% by mass or more, 85% by mass or more, 90% by mass or more, 95% by mass or more, or 99% by mass or more, depending on examples, may be 100% by mass in some examples, and may be 99% by mass or less in other examples, based on the total amount of the monomer units constituting the polymer.

The polymer in the surface layer 22 may have a glass transition temperature (Tg) of 160° C. or more in order to increase heat resistance. Tg of the polymer may be 170° C. or more or 180° C. or more, depending on examples, and may be 220° C. or less in some examples. Tg of the polymer is measured by the measurement method according to ASTM D 3418-82.

The surface layer 22 may contain the above-described polymer in some examples, and may further contain other components in addition to the above-described polymer in other examples. Examples of the other components include a filler, an aging inhibitor, an antistatic agent, a flame retardant, a tackifier, a dispersant, an oxidation inhibitor, an antifoaming agent, a leveling agent, a matting agent, a photostabilizer, a dye, and a pigment.

The content of the polymer in the surface layer 22 may be 80% by mass or more, 85% by mass or more, 90% by mass or more, 95% by mass or more, or 99% by mass or more, depending on examples, may be 100% by mass in some examples, and may be 99% by mass or less in other examples, based on the total amount of the surface layer.

The thickness of the surface layer 22 may be, for example, 0.1 μm or more, 1 μm or more, or 2 μm or more, and may be 20 μm or less, 10 μm or less, or 6 μm or less, depending on examples.

The endless belt 2 may be composed of the support 21 and the surface layer 22 in some examples, and may further include other layers in addition to the support 21 and the surface layer 22 in other examples. Examples of the other layers include an elastic layer and a primer layer. One or both of these elastic layer and primer layer may be provided between the support 21 and the surface layer 22.

In the endless belt 2 described above, since the polymer in the surface layer 22 includes the first monomer, the second monomer, and the third monomer (particularly the first monomer) as monomer units, the aliphatic ring in the first monomer exhibits the function of alleviating the external force, so as to obtain a superior flexibility. In the gloss treatment device 1, when the sheet P to which the toner TN is fixed is brought into contact with the endless belt 2, a difference in adhesive force of the sheet P with respect to the endless belt 2 between a part which includes the toner TN (an image area) and a part which excluding the toner TN (a non-image area) occurs, and accordingly a large external force is applied to the endless belt 2 in some cases. Additionally, in such a case, since the endless belt 2 can alleviate the external force, cracks on the surface of the endless belt 2 caused due to the external force are suppressed, which in turn suppresses a decrease in image quality after the gloss treatment is carried out.

The gloss treatment device 1 may be incorporated, for example, in an imaging system or device, that can form a color image by using colors, such as the color of magenta, yellow, cyan, and black. In an example of such an imaging system, the imaging system or imaging device includes, in addition to the gloss treatment device 1, a conveying device conveying the sheet P, an image carrier having a surface (a circumferential surface) on which an electrostatic latent image is to be formed, a developing device to develop the electrostatic latent image, a transfer device to transfer the toner TN to the sheet P, a fixing device to fix the toner TN to the sheet P, and a discharging device to discharge the sheet P. In some examples, the gloss treatment device 1 may be disposed between the fixing device and the discharging device in the conveying path of the sheet P. In another example, the gloss treatment device 1 may be attached to the discharging device and may be provided separately from respective configurations other than the gloss treatment device 1.

A method of manufacturing the endless belt 2 will be described. An example of the method of manufacturing the endless belt 2 includes operations of applying a composition on the loop-shaped support, wherein the composition contains monomer components including the first monomer, the second monomer, and the third monomer, and of polymerizing the monomer components to form the surface layer on the support. The details of the first monomer, the second monomer, the third monomer, and the support are as mentioned above. The first monomer, the second monomer, and the third monomer each may contain one kind of the aforementioned monomers in some examples, or may contain two or more kinds of the aforementioned monomers in other examples.

The content of the first monomer in the composition may be 2% by mass or more, 5% by mass or more, 10% by mass or more, 12% by mass or more, 15% by mass or more, or 20% by mass or more, depending on examples, based on the total amount of the monomer components, in order to further increase flexibility. Additionally, the content of the first monomer in the composition may be 80% by mass or less, 70% by mass or less, 60% by mass or less, 50% by mass or less, or 40% by mass or less, depending on examples, based on the total amount of the monomer components.

The content of the second monomer in the composition may be 0.5% by mass or more, 2% by mass or more, 5% by mass or more, 8% by mass or more, 10% by mass or more, or 11% by mass or more, depending on examples, based on the total amount of the monomer components, in order to increase offset resistance. Additionally, the content of the second monomer in the composition may be 50% by mass or less, 40% by mass or less, 30% by mass or less, or 20% by mass or less, depending on examples, based on the total amount of the monomer components.

The content of the third monomer in the composition may be 7% by mass or more, 20% by mass or more, 30% by mass or more, 40% by mass or more, or 50% by mass or more, depending on examples, based on the total amount of the monomer components, in order to impart superior strength. Additionally, the content of the second monomer in the composition may be 90% by mass or less, 85% by mass or less, 80% by mass or less, 70% by mass or less, 60% by mass or less, or 50% by mass or less, depending on examples, based on the total amount of the monomer components.

The monomer components may include the first monomer, the second monomer, and the third monomer without any other monomer according to some examples, and may further include other monomers mentioned above in addition to the first monomer, the second monomer, and the third monomer according to other examples. The total content of the first monomer, the second monomer, and the third monomer may be 70% by mass or more, 80% by mass or more, 90% by mass or more, 95% by mass or more, or 99% by mass or more, may be 100% by mass, and may be 99% by mass or less, depending on examples, based on the total amount of the monomer components.

The composition may further contain a polymerization initiator. The polymerization initiator may be, for example, a photopolymerization initiator. Examples of the photopolymerization initiator include an acetophenone compound, a benzoin ether compound, a benzophenone compound, a sulfur compound, an azo compound, a peroxide compound, and a phosphine oxide compound. The content of the polymerization initiator in the composition may be, for example, 1 part by mass or more, 2 parts by mass or more, or 3 parts by mass or more and may be 10 parts by mass or less, 8 parts by mass or less, or 6 parts by mass or less, depending on examples, with respect to 100 parts by mass of the monomer components.

The composition may further contain a photosensitizer. Examples of the photosensitizer include benzophenone, triphenylene, phenanthrene, biphenyl, and fluorene.

The composition may further contain a solvent dissolving the monomer components. Examples of the solvent include ethanol, isopropanol, butanol, toluene, xylene, acetone, methyl ethyl ketone, methyl isobutyl ketone, ethyl acetate, butyl acetate, and a fluorine-based solvent. The composition may further contain other components mentioned above.

The content of the monomer components in the composition may be 70% by mass or more, 80% by mass or more, 90% by mass or more, 95% by mass or more, or 99% by mass or more and may be 99% by mass or less, depending on examples, based on the total amount of the composition.

The composition is coated onto the outer circumferential surface of the support, for example, by a coating method. Examples of the coating method include a spray coating method, a spin-coating method, a roll coating method, a curtain coating method, a brush coating method, a flow coating method, and a dip coating method. The amount of the composition coated may be adjusted so that the surface layer 22 has a targeted thickness.

Next, the monomer components in the composition disposed on the support are polymerized. The polymerization of the monomer components is performed by heating or light irradiation. In some examples, in a case where the composition contains a photopolymerization initiator, the monomer components are polymerized by light irradiation. Light to be applied may be suitably selected according to the type of the photopolymerization initiator, and may be, for example, ultraviolet light. The irradiation amount of the light may be, for example, 500 to 3000 mJ/cm$^2$. A light source may be, for example, a mercury lamp or a halogen lamp.

In a case where the composition contains a solvent, the solvent may be removed by heating before, during, or after polymerization of the monomer components. The heating temperature when the solvent is removed may be, for example, 40° C. to 100° C. The heating time may be, for example, 1 to 20 minutes.

TEST EXAMPLES

Hereinafter, Test Examples of the endless belt will be described. It will be understood that the endless belt is not limited to these Test Examples.

Production of Endless Belt

Test Example 1

A molding machine was prepared to have a structure in which a cylinder is mounted on a pair of rotatable rollers which are juxtaposed and to include a demountable heating furnace that surrounds the entirety of the rotatable rollers. The cylinder may have a length of 250 mm and an inner circumference of 280 mm, and may be selected to have an inner circumferential surface that has been mirror-finished to have a surface roughness of 0.6 S or more. The cylinder has a structure which can rotate in response to the rotation of the rotatable rollers. While this cylinder is rotated, a predetermined amount of a slurry which will be described below, is supplied to the inner circumferential surface thereof, and a drying operation is performed, so as to obtain a self-standing support.

The equivalents of 3,3',4,4'-biphenyltetracarboxylic dianhydride and P-phenylenediamine were subjected to a polymerization reaction at normal temperature in an N-methylpyrrolidone solvent, so as to obtain a polyamic acid solution. N,N-dimethyl acetamide was added as a solvent to the polyamic acid solution obtained, and the solution was diluted. Next, carbon black (DBP oil absorption amount: 100 ml/100 g, MITSUBISHI Carbon Black MA-100 manufactured by Mitsubishi Chemical Corporation) having been dried at 100° C. for 2 hours, was added thereinto and mixed for 2 hours (25° C.) by a ball mill along with zirconia beads. The zirconia beads were removed to obtain a slurry. The composition of this slurry was such that the solid content of polyamic acid was 14.0 parts by mass, the content of the carbon black was 12.0 parts by mass, and the other component was the solvent. Additionally, the viscosity of the slurry was 850 cps (25° C.).

120 g of the obtained slurry was put in a container having a slit-shaped outlet with a length corresponding to the length of the cylinder in the molding machine. Next, while the molding machine was slowly rotated and driven, the slurry was supplied from the container having a slit-shaped outlet to the inside of the cylinder. This supply was slowly performed such that the slurry was substantially uniformly coated over the entire inner surface area of the cylinder. After the coating of the entire amount of the slurry was supplied, the rotation speed was increased further to be adjusted to a speed of 715 times/min, and the rotation was continued for 5 minutes. The external heating was started at the time point when the entire state became uniform. The temperature was gradually increased, and finally, heating was performed at 100° C. to 120° C. for about 30 minutes. After the heating was stopped, cooling was performed to room temperature and then the rotation was stopped. At this stage, about 60 to 80% by weight of the solvent was removed by evaporation so as to obtain a support precursor having a loop shape which is formed of a polyimide precursor containing about 20 to 40% by weight of the remaining solvent. The thickness of the support precursor was 100 μm. This support precursor was peeled off from the cylinder, a rod having an outer diameter smaller than the inner diameter of the support precursor by about 3% was then inserted into the support precursor, the support precursor was put into another heating device, and heating was performed at 200° C. to 300° C. for 40 minutes and at 300° C. to 400° C. for 40 minutes while the temperature was gradually increased. As a result, a loop-shaped support (thickness: 80 μm) which is formed of polyimide was obtained.

A composition was prepared by dissolving 15 parts by mass of tricyclodecane dimethanol diacrylate (the first monomer, TCDDA), 25 parts by mass of a solution (a solvent: methyl ethyl ketone) of 30% by mass of 2,2,3,3,4,4,5,5,6,6,7,7-dodecafluoro-1,8-octanediol diacrylate (the second monomer), 60 parts by mass of dipentaerythritol hexaacrylate (the third monomer), and 5 parts by mass of 1-hydroxycyclohexyl phenylketone (the photopolymerization initiator) in methyl isobutyl ketone (the solvent) to obtain a solid content concentration of 70 to 90% by mass. Subsequently, the composition was coated onto the outer circumferential surface of the support by an air spray. Thereafter, the composition was irradiated with ultraviolet light under conditions of an irradiation distance of 100 mm and an irradiation amount of 1 J/cm$^2$, by using a high-pressure mercury lamp having an output of 400 W, as a light source, while rotating the support, so as to polymerize the monomer components. As a result, a surface layer (thickness: 15 μm) was formed on the support to obtain an endless belt.

Test Examples 2 to 10

An endless belt was obtained in a similar manner as for Example 1, with the exception that the compositions of the monomer components (the first monomer, the second monomer, and the third monomer) were varied as indicated in Table 1.

Test Example 11

An endless belt was obtained in a similar manner as for Example 1, with the exception that cyclohexane dimethanol diacrylate (the first monomer, CHDA) was used instead of tricyclodecane dimethanol diacrylate (TCDDA) and the compositions of the monomer components (the first monomer, the second monomer, and the third monomer) were changed to those indicated in Table 1.

Test Example 12

An endless belt was obtained in a similar manner as for Example 1, with the exception that the first monomer was not used and the compositions of the monomer components (the second monomer and the third monomer) were changed to those indicated in Table 1.

Evaluation of Flexibility

The respective endless belts thus obtained of Test Examples 1 to 12 were subjected to a mandrel test continuously ten times according to ASTM D522/D522M-17. The appearances of the endless belts after the test were observed by visual inspection and the flexibility was evaluated according to the following observation indicators A to E. The observation results are shown in Table 1.
A There was no change.
B A trace of the bent portion was slightly observed.
C A trace of the bent portion was observed (negligible in practical applications).
D Minute cracks occurred.
E Cracks occurred.

TABLE 1

| | Composition of monomer component (% by mass) | | | | Tg of polymer (° C.) | Flexibility |
|---|---|---|---|---|---|---|
| | First monomer | | Second | Third | | |
| | TCDDA | CHDA | monomer | monomer | | |
| Test Example 1 | 18.2 | — | 9.1 | 72.7 | 184 | A |
| Test Example 2 | 13.4 | — | 14.4 | 72.2 | 166 | B |
| Test Example 3 | 46.6 | — | 1.6 | 51.8 | 208 | A |
| Test Example 4 | 9.6 | — | 16.1 | 74.3 | 163 | B |
| Test Example 5 | 4.3 | — | 18.5 | 77.3 | 157 | C |
| Test Example 6 | 46.1 | — | 9.1 | 44.8 | 172 | A |
| Test Example 7 | 48.5 | — | 9.1 | 42.4 | 171 | A |
| Test Example 8 | 50.6 | — | 11.4 | 38.0 | 162 | A |
| Test Example 9 | 79.7 | — | 11.4 | 8.9 | 151 | A |
| Test Example 10 | 39.8 | — | 0.9 | 59.2 | 210 | A |
| Test Example 11 | — | 9.6 | 8.7 | 81.7 | 170 | C |
| Test Example 12 | — | — | 11.4 | 88.6 | 193 | E |

In Table 1, the composition of the monomer component indicates the content (% by mass) of each monomer based on the total amount of the monomer components. The content of the second monomer corresponds to the content of the second monomer itself (e.g., the content obtained by removing methyl ethyl ketone from the methyl ethyl ketone solution). Furthermore, Tg of the polymer is a value measured by the measurement method according to ASTM D 3418-82.

As described above, in the endless belt, the polymer in the surface layer includes the first monomer, the second monomer, and the third monomer (particularly the first monomer) as monomer units, and thereby superior flexibility can be achieved.

Evaluation of Heat Resistance

For each of the endless belts of the Test Examples, the heat resistance was additionally evaluated, by the following procedure. First, the endless belts were put in an oven set at 160° C., for 24 hours, then taken out, and left to stand at room temperature for 24 hours. Subsequently, the mandrel test was performed with respect to the endless belts in the same manner as in the above-described flexibility test. The appearances of the endless belts after the test were observed by visual inspection and the heat resistance was evaluated according to the following observation indicators A to E. The observation results are shown in Table 2.
A There was no change.
B A trace of the bent portion was slightly observed.
C A trace of the bent portion was observed (negligible in practical applications).
D Minute cracks occurred.
E Cracks occurred.

Evaluation of Strength

For each of the endless belts of the Test Examples 1 to 11, the strength was evaluated based on measurement results of a pencil hardness and results of an adhesion test as described below. The results are shown in Table 2.

Pencil Hardness

For each of the endless belts of the Test Examples 1 to 11, the pencil hardness was measured according to ASTM D3363-05(2011)e2 and the strength was evaluated according to the following measurement indicators.

A 3H or more
B H or more and 2H or less
C F or less

Adhesion Test

For each of the endless belts of the Test Examples 1 to 11, the adhesion test was performed according to ASTM D3359-17 and the strength was evaluated according to the following indicators.

A There was no 100/100 chipped edge.
B There were 100/100 chipped edges.
C 95/100 or more Evaluation of Offset Resistance For each of the endless belts of the Test Examples 1 to 11, the offset resistance was additionally evaluated, by the following procedure. The results are shown in Table 2.

A 45 mm-square cyan halftone image of one dot and one space was produced by a 600 DPI printer, the image was placed on a hot plate so that the image was oriented upwardly, forming an upper surface, and a 50 mm-square endless belt test piece was placed thereon so that a surface of the test piece was in contact with the image. Further, a silicone rubber plate of 5 mm was placed thereover to apply a 0.25 kg/cm² load on the upper surface. In this state, the hot plate was heated so that the temperature of the hot plate surface reached 130° C. at an average temperature increasing rate of about 1° C./sec. At the time point when five seconds elapsed after the temperature reached 130° C., the temperature was decreased to 40° C. at an average temperature decreasing rate of about 0.2° C./sec by using a fan. After the temperature was decreased, the load was rapidly released, and the image was slowly peeled off from the belt surface. The state of the toner attached onto this belt surface was observed with a laser microscope, a proportion of the coated area of the residual toner with respect to the contact area of the halftone image on the belt surface was calculated, and the offset resistance was evaluated according to the following indicators.

A Less than 1%
B 1% or more and less than 3%
C 3% or more and less than 5%
D 5% or more and less than 10%
E 10% or more

TABLE 2

|   | Strength | | | |
| --- | --- | --- | --- | --- |
|   | Heat resistance | Pencil hardness | Adhesion test | Offset resistance |
| Test Example 1 | A | A | A | A |
| Test Example 2 | B | A | A | A |
| Test Example 3 | A | B | A | C |
| Test Example 4 | B | A | B | A |
| Test Example 5 | C | A | C | A |
| Test Example 6 | A | B | A | A |
| Test Example 7 | A | B | A | A |
| Test Example 8 | B | B | B | A |
| Test Example 9 | C | C | C | A |
| Test Example 10 | A | A | A | E |
| Test Example 11 | A | A | A | A |

As described above, in the endless belt, the polymer in the surface layer includes predetermined amounts of the second monomer and the third monomer as monomer units in addition to the first monomer, so as to achieve superior heat resistance, strength, and offset resistance in addition to superior flexibility.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

The invention claimed is:

1. An endless belt comprising:
a loop-shaped support; and
a surface layer formed on the support,
wherein the surface layer comprises a polymer including monomer units from a first monomer having a polymerizable group and an aliphatic ring, a second monomer having a polymerizable group and a fluorine atom, and a third monomer having 4 or more polymerizable groups.

2. The endless belt according to claim 1, wherein the polymerizable group in the first monomer, the polymerizable group in the second monomer, and the polymerizable groups in the third monomer are (meth)acryloyl groups.

3. The endless belt according to claim 2, wherein the first monomer comprises a compound represented by the following formula (1A):

(1A)

wherein each of $R^{11}$ and $R^{12}$ independently represents a hydrogen atom or a methyl group, and $R^{13}$ represents a divalent group having an aliphatic ring.

4. The endless belt according to claim 3, wherein the second monomer comprises a compound represented by the following formula (2A):

(2A)

wherein each of $R^{21}$ and $R^{22}$ independently represents a hydrogen atom or a methyl group, and $R^{23}$ represents a divalent group having a fluorine-substituted hydrocarbon group.

5. The endless belt according to claim 4, wherein the third monomer comprises a compound represented by the following formula (3A):

(3A)

wherein m represents an integer of 4 or more, each of $R^{31}$'s independently represents a hydrogen atom or a methyl group, and $R^{32}$ represents a residue of a polyhydric alcohol from which m hydroxyl groups are removed.

6. The endless belt according to claim 3, wherein a content of the first monomer is 2% by mass to 80% by mass, based on a total amount of the monomer units constituting the polymer.

7. The endless belt according to claim 4, wherein a content of the second monomer is 0.5% by mass to 50% by mass, based on a total amount of the monomer units constituting the polymer.

8. The endless belt according to claim 5, wherein a content of the third monomer is 7% by mass to 85% by mass, based on a total amount of the monomer units constituting the polymer.

9. A gloss treatment device comprising:
the endless belt according to claim 1;
a heating device to heat the endless belt;
a pressure device to press the endless belt against the heating device; and
a cooling device cooling the endless belt.

10. The gloss treatment device according to claim 9, wherein the first monomer comprises a compound represented by the following formula (1A):

wherein each of $R^{11}$ and $R^{12}$ independently represents a hydrogen atom or a methyl group, and $R^{13}$ represents a divalent group having an aliphatic ring,
wherein the second monomer comprises a compound represented by the following formula (2A):

wherein each of $R_{21}$ and $R^{22}$ independently represents a hydrogen atom or a methyl group, and $R^{23}$ represents a divalent group having a fluorine-substituted hydrocarbon group, and
wherein the third monomer comprises a compound represented by the following formula (3A):

wherein m represents an integer of 4 or more, each of $R^{31}$s independently represents a hydrogen atom or a methyl group, and $R^{32}$ represents a residue of a polyhydric alcohol from which m hydroxyl groups are removed.

11. The gloss treatment device according to claim 10, wherein a content of the first monomer is 2% by mass to 80% by mass, based on a total amount of the monomer units constituting the polymer, a content of the second monomer is 0.5% by mass to 50% by mass, based on the total amount of the monomer units constituting the polymer, and
a content of the third monomer is 7% by mass to 85% by mass, based on the total amount of the monomer units constituting the polymer.

12. A method of manufacturing an endless belt, the method comprising:
applying a composition on a loop-shaped support wherein the composition comprises monomer components including a first monomer having a polymerizable group and an aliphatic ring, a second monomer having a polymerizable group and a fluorine atom, and a third monomer having 4 or more polymerizable groups; and
polymerizing the monomer components to form a surface layer on the support.

13. The method according to claim 12, wherein the first monomer comprises a compound represented by the following formula (1A):

wherein each of $R^{11}$ and $R^{12}$ independently represents a hydrogen atom or a methyl group, and $R^{13}$ represents a divalent group having an aliphatic ring,
wherein the second monomer comprises a compound represented by the following formula (2A):

wherein each of $R^{21}$ and $R^{22}$ independently represents a hydrogen atom or a methyl group, and $R^{23}$ represents a divalent group having a fluorine-substituted hydrocarbon group, and
wherein the third monomer comprises a compound represented by the following formula (3A):

wherein m represents an integer of 4 or more, each of $R^{31}$s independently represents a hydrogen atom or a methyl group, and $R^{32}$ represents a residue of a polyhydric alcohol from which m hydroxyl groups are removed.

14. The method according to claim 13, wherein a content of the first monomer is 2% by mass to 80% by mass, based on a total amount of the monomer components,
wherein a content of the second monomer is 0.5% by mass to 50% by mass, based on the total amount of the monomer components, and wherein a content of the third monomer is 7% by mass to 85% by mass, on the total amount of the monomer components.

15. The method according to claim 14, wherein the composition that is applied on the loop-shaped support comprises a photopolymerization initiator, and wherein the monomer components are polymerized by light irradiation.

\* \* \* \* \*